US012350995B2

(12) United States Patent
Gesell et al.

(10) Patent No.: US 12,350,995 B2
(45) Date of Patent: Jul. 8, 2025

(54) HEATING, VENTILATION AND/OR AIR CONDITIONING UNIT FOR A CAR

(71) Applicant: VALEO KLIMASYSTEME GMBH, Bad Rodach (DE)

(72) Inventors: Bodo Gesell, Bad Rodach (DE); Peter Koch, Bad Rodach (DE); Stefan Gaertner, Bad Rodach (DE)

(73) Assignee: VALEO KLIMASYSTEME GmbH, Bad Rodach (DE)

( * ) Notice: Subject to any disclaimer, the term of this patent is extended or adjusted under 35 U.S.C. 154(b) by 250 days.

(21) Appl. No.: 17/777,886

(22) PCT Filed: Nov. 20, 2020

(86) PCT No.: PCT/EP2020/082794
§ 371 (c)(1),
(2) Date: May 18, 2022

(87) PCT Pub. No.: WO2021/099523
PCT Pub. Date: May 27, 2021

(65) Prior Publication Data
US 2022/0410650 A1    Dec. 29, 2022

(30) Foreign Application Priority Data
Nov. 21, 2019    (DE) .................... 10 2019 131 472.0

(51) Int. Cl.
*B60H 1/00*    (2006.01)
(52) U.S. Cl.
CPC ............... *B60H 1/00064* (2013.01); *B60H 2001/00092* (2013.01)
(58) Field of Classification Search
CPC ............... B60H 1/00064; B60H 2001/00092
(Continued)

(56) References Cited

U.S. PATENT DOCUMENTS 4,531,671 A * 7/1985 Schwenk ........... B60H 1/00071
237/12.3 B
6,231,437 B1 * 5/2001 Loup ................. B60H 1/00671
454/160
(Continued)

FOREIGN PATENT DOCUMENTS

DE    10337195 A1    3/2005
EP    1319537 A2    6/2003
(Continued)

OTHER PUBLICATIONS

Office Action issued in counterpart European Patent Application No. 20811570.9 mailed Mar. 11, 2024 (6 pages).

*Primary Examiner* — Steve S Tanenbaum
(74) *Attorney, Agent, or Firm* — Osha Bergman Watanabe & Burton LLP

(57) ABSTRACT

A heating, ventilation and/or air conditioning unit (10) for a car is specified, having a first air guide (22) for guiding a first, cold air stream and having a second air guide (24) for guiding a second, warm air stream which is separate from the first air stream, wherein a heating device (26) for warming the second air stream is arranged in the second air guide (24). The heating, ventilation and/or air conditioning unit (10) furthermore has a first mixing chamber (28) and a second mixing chamber (30), wherein the first mixing chamber (28) and the second air guide (24) each have at least one inlet opening (32, 34) to the second mixing chamber (30). In the second air guide (24), there is arranged a flap (44) which is movable between a closed position, in which a flow path of the second air stream to the first mixing chamber (28) is closed, and an open position, in which the second air stream can flow into the first mixing chamber (30), wherein the flap
(Continued)

(44) is arranged downstream of the heating device (26) and at an inlet opening (27) of the second air guide (24) into the first mixing chamber (28).

8 Claims, 2 Drawing Sheets

(58) Field of Classification Search
USPC .......................................................... 165/42
See application file for complete search history.

(56) References Cited

U.S. PATENT DOCUMENTS

| | | | |
|---|---|---|---|
| 8,408,980 B2* | 4/2013 | Nanaumi | B60H 1/00842 454/126 |
| 2012/0252342 A1* | 10/2012 | Stang | B60H 1/00 454/126 |

FOREIGN PATENT DOCUMENTS

| | | | | |
|---|---|---|---|---|
| FR | 2778152 A1 | * | 11/1999 | ......... B60H 1/00064 |
| JP | 2002-002250 A | | 1/2002 | |
| JP | 2004256048 A | * | 9/2004 | |
| JP | 2014100952 A | * | 6/2014 | |
| KR | 10-2018-0029128 A | | 3/2018 | |
| WO | 2015/012286 A1 | | 1/2015 | |

* cited by examiner

HEATING, VENTILATION AND/OR AIR CONDITIONING UNIT FOR A CAR

The invention relates to a heating, ventilation and/or air conditioning unit for a car.

Heating, ventilation and/or air conditioning units are designed to generate one or more temperature-controlled air streams. In cars, such units are used for the aeration and air conditioning of a car interior. Here, it is commonly possible for variable air streams, which may each have a different temperature, to be fed to different regions of the car interior. In order to adjust whether and how much air is fed to a region, the air streams to different regions of the car interior can be selectively blocked or allowed.

In a heating, ventilation and/or air conditioning unit, a cold air stream is generally available downstream of an evaporator, a proportion of which cold air stream is branched off and warmed by means of a heat exchanger. In this way, a cold air stream and a warm air stream which is separate from said cold air stream are obtained. In order for an air stream for the air conditioning of the car interior to be brought to a desired temperature, the two air streams can be mixed in a predefined mixing ratio.

In order to improve comfort for one or more car occupants, it is desirable for a car occupant to be able to set the temperature for different regions of the car interior to a desired temperature in a particularly exact manner.

It is therefore an object of the invention to provide a heating, ventilation and/or air conditioning unit with which the temperature and the aeration in different regions of the car interior can be individually adjusted.

Said object is achieved according to the invention by means of a heating, ventilation and/or air conditioning unit for a car, having a first air guide for guiding a first, cold air stream and having a second air guide for guiding a second, warm air stream which is separate from the first air stream, wherein a heating device for warming the second air stream is arranged in the second air guide. The heating, ventilation and/or air conditioning unit furthermore has a first mixing chamber, wherein the first air guide and the second air guide open into the first mixing chamber, and a second mixing chamber, wherein the first mixing chamber and the second air guide each have at least one opening to the second mixing chamber. In the the second air guide, there is arranged a flap which is movable between a closed position, in which a flow path of the second air stream to the first mixing chamber is closed, and an open position, in which the second air stream can flow into the first mixing chamber, wherein the flap is arranged downstream of the heating device and at an opening of the second air guide into the first mixing chamber.

By means of the heating, ventilation and/or air conditioning unit according to the invention, the cold air stream and the warm air stream can be mixed in the first mixing chamber in order to generate a mixed air stream. The mixed air stream and at least a proportion of the warm air stream can in turn be mixed with one another in the second mixing chamber. In this way, it is possible to generate two differently temperature-controlled air streams. By virtue of the flap being arranged downstream of the heating device and at the opening of the second air guide into the first mixing chamber, it is possible for warm air from the second air guide to be fed to the second mixing chamber, whereas a warm air stream into the first mixing chamber is blocked. If the flap is in the closed position, only cold air from the first air guide is fed to the first mixing chamber. By means of the arrangement according to the invention of the flap in the second air guide, it is thus possible for the temperature of the mixed air that has been mixed in the two mixing chambers to be set in a particularly flexible manner.

The flap, in its closed position, preferably completely closes the opening to the first mixing chamber, such that no warm air can flow into the first mixing chamber aside from small leakage streams.

The heating device is for example a heat exchanger. By means of a heat exchanger, the waste heat of an engine can be utilized to warm the air stream, such that the heating, ventilation and/or air conditioning unit is particularly energy-efficient. Alternatively or in addition, it is also possible for an electric heating element to be provided in order to heat the warm air stream particularly quickly. It is thus possible for a warm air stream to be immediately generated even directly after a cold start.

In the first air guide, there is preferably arranged a further flap which is movable between a closed position, in which a flow path of the first air stream to the first mixing chamber is closed, in particular completely closed, and an open position, in which the first air stream can flow into the first mixing chamber. In this way, a flow volume of the cold air stream into the first mixing chamber can also be adjusted. In this way, the temperature of the mixed air that has been mixed in the first mixing chamber can be set in a particularly flexible manner, in particular through corresponding control of the flap position.

The flap in the first air guide is also referred to as cold-air flap, and the flap in the second air guide is also referred to as warm-air flap.

In one embodiment, at the opening of the first mixing chamber to the second mixing chamber and/or at the opening of the second air guide to the second mixing chamber, there is arranged in each case one flap which is mounted so as to be movable between an open position and a closed position and which serves for selectively opening or closing the opening of the first mixing chamber to the second mixing chamber and/or the opening of the second air guide to the second mixing chamber. Through corresponding positioning of the flaps at these openings, it is thus possible for the mixing ratio of warm air and mixed air in the second mixing chamber to be set in a particularly flexible manner. Furthermore, in addition to the mixing ratio, it is also possible for a volume flow out of the second mixing chamber to be adjusted. For example, it is possible for both flaps, or at least one, to be open to a maximum extent. In particular, both flaps may each be only partially opened, such that a volume flow out of the second mixing chamber is smaller than in the case of a maximally opened position of the two flaps. In a further scenario, both flaps may be closed if the second mixing chamber is not required. In the closed state of the flaps, these openings may be completely closed, such that, aside from a small leakage stream, no air can flow through these opening.

In one embodiment, the two flaps are kinematically coupled to one another, for example by means of a cam mechanism. In this way, the two flaps can be moved by means of a single drive, in particular from the open position into the closed position and vice versa.

Preferably, the two flaps are kinematically coupled to one another such that the two flaps can close the openings to the second mixing chamber simultaneously. A position of the flaps can be controlled particularly easily by means of such a kinematic coupling.

More specifically, the two flaps may be kinematically coupled to one another such that the flaps are movable with one another oppositely in linear fashion or are movable with one another oppositely in non-linear fashion. This is possible by means of a corresponding design of an interposed mechanism, for example of the cam track of the cam mechanism. Such a coupling has the advantage that the setting of the flap positions relative to one another can be performed within certain specifications. This means that the setting possibilities for the two flaps relative to one another can be restricted, specifically such that only setting possibilities which are expedient from an energy aspect are allowed.

According to a further embodiment, the two flaps are movable independently of one another, in particular by means of an electric actuator. In this way, the position of each flap can be set in a particularly flexible manner. In particular, in this way, any desired ratio of warm air to mixed air can be set in the second mixing chamber.

In an alternative embodiment, a flap which is mounted so as to be movable between a first position and a second position may be provided, which in the first position closes the opening of the first mixing chamber to the second mixing chamber and in the second position closes, in particular completely closes, the opening of the second air guide to the second mixing chamber. In the first position and in the second position of the flap, which each constitute a closed position, it is thus the case that an air stream through only one of the two openings is possible. In the intermediate positions, an air stream through both openings is possible. This embodiment has the advantage that only one flap is required to adjust the air feed to the second mixing chamber and the mixing ratio of cold air and warm air in the second mixing chamber. This embodiment thus has a cost advantage in relation to the embodiment with separate flaps at the openings to the second mixing chamber.

In one embodiment, the first mixing chamber has at least one outlet opening which leads to a car interior. In this way, the temperature-controlled mixed air can be fed to the car interior for the ventilation and temperature control thereof. For example, at least in each case one outlet opening to a windscreen, to a front seat, in particular to a driver's seat and a front passenger seat and/or to a rear seat bench may be provided.

At the at least one outlet opening, there is preferably likewise arranged a flap which is mounted so as to be movable between an open position and a closed position and which can close the associated outlet opening as required if no air stream is required in a car region associated with the outlet opening.

More specifically, the first mixing chamber may have separate channels to different interior regions, which channels are each closable by means of a dedicated flap.

Furthermore, the heating, ventilation and/or air conditioning unit may have an evaporator, wherein the first and the second air guide are arranged downstream of the evaporator. By means of the evaporator, the air can firstly be cooled before it enters the air guides. In particular, at the evaporator, an overall air stream is cooled to the temperature of the cold air stream. Said overall air stream can then be divided into the first and the second air guide.

The first air guide, the second air guide, the first mixing chamber and/or the second mixing chamber may be formed in a common housing. In this way, the heating, ventilation and/or air conditioning unit is of particularly compact form. Furthermore, in this way, the outlay for the assembly of the unit can be kept low. The housing is formed for example by multiple shells which are connected to one another.

The first air guide and the second air guide may in this case have a common partition at least in certain sections. This likewise contributes to a compact design of the unit.

The heating device and/or the evaporator are preferably accommodated in the common housing. This likewise contributes to a compact design of the heating, ventilation and/or air conditioning unit.

In order to set the position of all of the abovementioned flaps, the heating, ventilation and/or air conditioning unit may have an electronic control device which is designed to control the position of the movably mounted flaps. It is thus possible for a temperature profile desired by a car occupant to be set in the car interior.

Further advantages and features of the invention will emerge from the following description and from the appended drawings, to which reference is made. In the drawings:

FIG. 1 shows a heating, ventilation and/or air conditioning unit 10 according to the invention for a car in a schematic sectional illustration. The heating, ventilation and/or air conditioning unit 10 serves for the aeration and air conditioning of a car interior.

Figure 1:
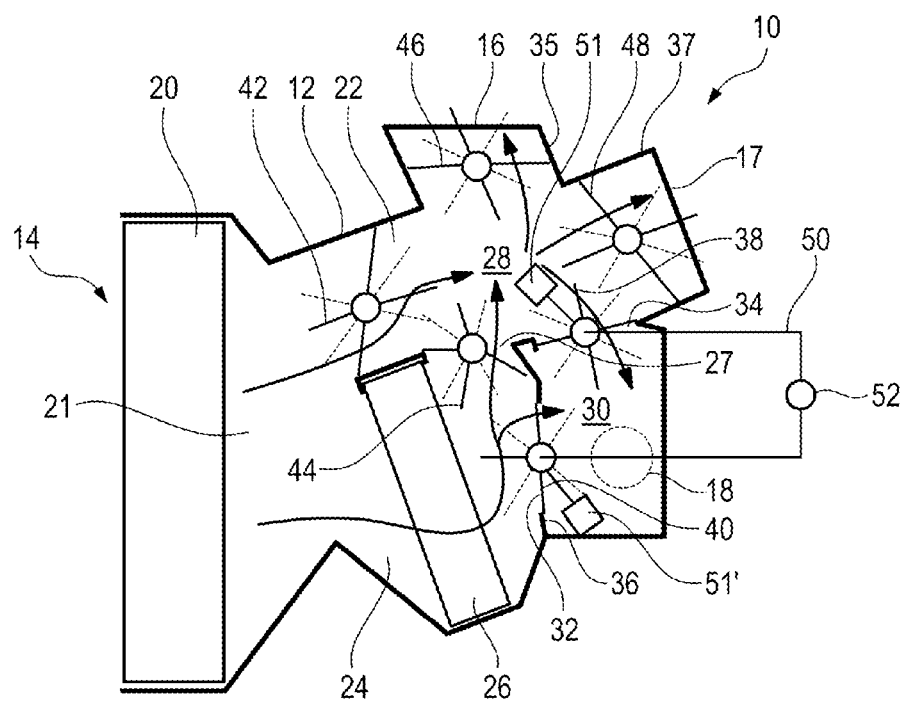
FIG. 1 shows a heating, ventilation and/or air conditioning unit according to the invention in a schematic sectional illustration.

The heating, ventilation and/or air conditioning unit 10 has a housing 12, which is preferably manufactured from plastic.

The housing 12 has an inlet opening 14 and multiple outlet openings 16, 17, 18, which lead to various air diffusers distributed in the interior.

An evaporator 20 is arranged in the region of the inlet opening 14. More specifically, the evaporator 20 is arranged in the housing 12.

Downstream of the inlet opening 14 and downstream of the evaporator 20, the air guide channel 21 divides into a first air guide 22 for guiding a first, cold air stream and a second air guide 24 for guiding a second, warm air stream in the housing 12 formed. The first air guide 22 may also be referred to as cold-air guide, and the second air guide 24 may be referred to as warm-air guide.

The air guides 22, 24 are formed at least in certain sections as channels and/or are formed at least in certain sections by walls of the housing 12, along which the cold air stream and/or warm air stream can flow.

A heating device 26, more specifically a heat exchanger, is arranged in the second air guide 24. The heating device 26 is likewise arranged in the housing 12.

Instead of a heat exchanger or in addition to this, the heating device 26 may also comprise an electric heating element.

The heating device 26 is dimensioned so as to completely fill a flow cross section of the second air guide 24 at the position at which the heating device 26 is arranged, aside from manufacturing-induced gaps in the peripheral region. This means that the entirety of the second, warm air stream must flow through the heating device.

The heating, ventilation and/or air conditioning unit 10 furthermore comprises a first mixing chamber 28 and a second mixing chamber 30. The two mixing chambers 28, 30 are likewise formed in the housing 12 but are separate from one another.

Here, the first air guide 22 is led past the heating device 26 and opens directly into the first mixing chamber 28 downstream of the heating device 26.

The second air guide 24 furthermore has an opening 32 to the second mixing chamber 30. In other words, the second air guide 24 has a branch to the second mixing chamber 30.

Here, the opening 32 is formed in a common wall 36 of the second air guide 24 and of the second mixing chamber 30.

Furthermore, the first mixing chamber 28 has an opening 34 to the second mixing chamber 30.

Of the outlet openings 16, 17, 18, two outlet openings 16, 17 are formed in the first mixing chamber 28 and one outlet opening 18 is formed in the second mixing chamber 30.

The two outlet openings 16, 17 lead for example to different front regions in a car interior, such as a windscreen and a front seat, and conduct mixed air to said regions from the first mixing chamber 28. In particular, the first mixing chamber 28 has separate channels 35, 37 to different interior regions.

For example, the outlet opening 18 leads to a footwell and conducts mixed air to said footwell from the second mixing chamber 30.

The second mixing chamber 30 has a smaller volume than the first mixing chamber 28, because a smaller volume flow is required for air conditioning in a footwell of the car than in the other regions of the car interior.

It is optionally possible for yet further outlet openings to be provided if a yet further subdivision of the mixed air streams is desired.

In order to adjust the distribution of all air streams in the housing 12 and the feed of the mixed air streams to the car interior, multiple movably mounted flaps 38, 40, 42, 44, 46, 48 are provided in the housing.

At the two openings 32, 34 to the second mixing chamber 30, there is arranged in each case one flap 38, 40 which is mounted so as to be movable between an open position and a closed position in order to selectively open or close the openings 32, 34.

When the flap 38 is closed, the two mixing chambers 28, 30 are separated from one another in terms of flow.

In one embodiment, the two flaps 38, 40 may be kinematically coupled to one another, for example by means of a mechanism such as a cam mechanism 50. Accordingly, both flaps 38, 40 can be moved simultaneously through the actuation of a camshaft 52. The cam mechanism 50 is illustrated purely schematically in FIG. 1.

In particular, the two flaps 38, 40 are kinematically coupled to one another such that the two flaps can close the openings 32, 34 to the second mixing chamber 30 simultaneously.

Here, the flaps 38, 40 may be movable with one another oppositely in linear fashion or movable with one another oppositely in non-linear fashion. This is possible through corresponding design of the cam track of the cam mechanism 50 or generally of the mechanism.

In an alternative embodiment, the two flaps 38, 40 may be movable entirely independently of one another. In this case, it is preferable for each of the two flaps 38, 40 to be assigned an electric actuator 51, 51', which electric actuators are merely symbolically illustrated.

Furthermore, a flap 42, also referred to as cold-air flap, is arranged in the first air guide 22. As viewed in a flow direction, the flap 42 is situated to the side of the heating device 26 and defines the opening to the first mixing chamber 28.

Furthermore, a flap 44, also referred to as warm-air flap, is arranged in the second air guide 24. The flap 44 is arranged downstream of the heating device 26 and at an opening 27 of the second air guide 24 into the first mixing chamber 28.

Both the cold-air flap 42 and the warm-air flap 44 are movable from an open position into a closed position in order to adjust the air stream through the associated air guide 22, 24. In the closed position of the flap 42, 44, an air stream through the associated air guide 22, 24 is preferably blocked completely, aside from small leakage streams.

Depending on the positioning of the flaps 42, 44, the temperature of the mixed air thus lies between the temperature of the cold air and the temperature of the warm air.

The flaps 46, 48 are arranged at the outlet openings 16, 17 and can be moved from an open position into a closed position in order to adjust or completely block an air stream through the outlet openings 16, 17 to the car interior. In particular, the channels 35, 37 to the various interior regions are each closable by means of the flaps 46, 48.

A further flap at the outlet opening 18 can be omitted, because an air stream through the outlet opening 18 can already be blocked by means of the flaps 38, 40.

The flaps 38, 40, 42, 44, 46, 48 illustrated in FIG. 1 are exclusively so-called two-wing flaps, that is to say the flaps 38, 40, 42, 44, 46, 48 have wings which intersect at the center of rotation and which extend to both sides beyond the center of rotation by a similar or equal length. Such a form of the flaps 38, 40, 42, 44, 46, 48 has the advantage that a torque acting on the flaps 38, 40, 42, 44, 46, 48 as a result of an air flow is considerably lower than that in the case of a single-wing flap. In particular, the resultant torque may be approximately zero. It is however also conceivable for one or more flaps to be designed as single-wing flaps.

In FIG. 1, the flaps 38, 40, 42, 44, 46, 48 are illustrated in each case in a closed position. For illustrative purposes, an open position of the flaps 38, 40, 42, 44, 46, 48 is additionally illustrated by dashed lines.

Below, the functioning of the heating, ventilation and/or air conditioning unit 10 will be discussed on the basis of FIG. 1. Here, the various air streams are illustrated by arrows for the purposes of improved understanding.

When the heating, ventilation and/or air conditioning unit 10 is in operation, air flows through the inlet opening 14 into the housing 12. Here, the air stream flows through the evaporator 20, such that a cold overall air stream is generated.

This overall air stream can, in a manner dependent on the position of the flap 42, be divided into the first, cold air stream and the second, warm air stream. In order to generate a cold air stream in the first air guide 22, the flap 42 must be at least partially opened, such that air can flow into the first air guide 22.

Here, the temperature of the cold air stream corresponds to the temperature of the overall air stream.

The warm air stream is generated by virtue of that part of the overall air stream which flows into the second air guide 24 flowing through the heating device 26 and, in the process, absorbing heat.

Subsequently, the cold air stream and optionally at least a proportion of the warm air stream can flow into the first mixing chamber 28, wherein, in the mixing chamber 28, the two air streams that have entered are merged again and thoroughly mixed. The volume of the warm air stream fed to the first mixing chamber 28 is in this case dependent on the position of the flap 44. The temperature of the mixing air in the first mixing chamber can in this case be set to a desired temperature through corresponding adjustment of the respective volume of the warm air stream and of the cold air stream.

The temperature-controlled mixed air from the mixing chamber 28 can subsequently be fed via the outlet openings 16, 17 to the car interior, if the flaps 46, 48 are at least partially open, for the purposes of air conditioning of the associated regions of the car interior.

Additionally, mixed air can be generated in the second mixing chamber 30 by virtue of mixed air on the first mixing chamber 28 being fed to the second mixing chamber 30 via the opening 34 and, additionally, warm air being branched off from the second air guide 24 and fed to the second mixing chamber 30 via the opening 32. It is thus possible, in the second mixing chamber 30, for mixed air to be generated which has a temperature which differs from the temperature generated in the first mixing chamber 28, wherein, in particular, the mixed air generated in the second mixing chamber 30 may be warmer than the mixed air generated in the first mixing chamber 28.

Warm air from the second air guide can be fed to the second mixing chamber 30 even when the warm-air flap 44 is closed, because the flap 44 is arranged at the opening of the second air guide 24 to the first mixing chamber 28, and the opening 32 of the second air guide 24 to the second mixing chamber thus lies within the second air guide 24.

The mixed air from the second mixing chamber 30 can be fed via the outlet opening 18 to a further region of the car interior, in particular the footwell.

The second mixing chamber 30 however does not imperatively need to be utilized to generate mixed air. If the flap 38 is completely closed and the flap 40 is at least partially open, exclusively warm air from the second air guide 24 is fed to the second mixing chamber 30, that is to say no mixing of air occurs. In this case, the second mixing chamber 30 serves merely as an air guide.

Alternatively, it is possible for only mixed air from the first mixing chamber 28 to be fed to the second mixing chamber 30 if the flap 40 is completely closed and the flap 38 is at least partially open.

As a further alternative, the two flaps 38, 40 can both be completely closed. In this case, only the first mixing chamber 28 is used, and in this case the second mixing chamber 30 is inactive.

In the same way, with corresponding flap positioning, the first mixing chamber 28 can also serve merely as an air guide.

Figure 2:
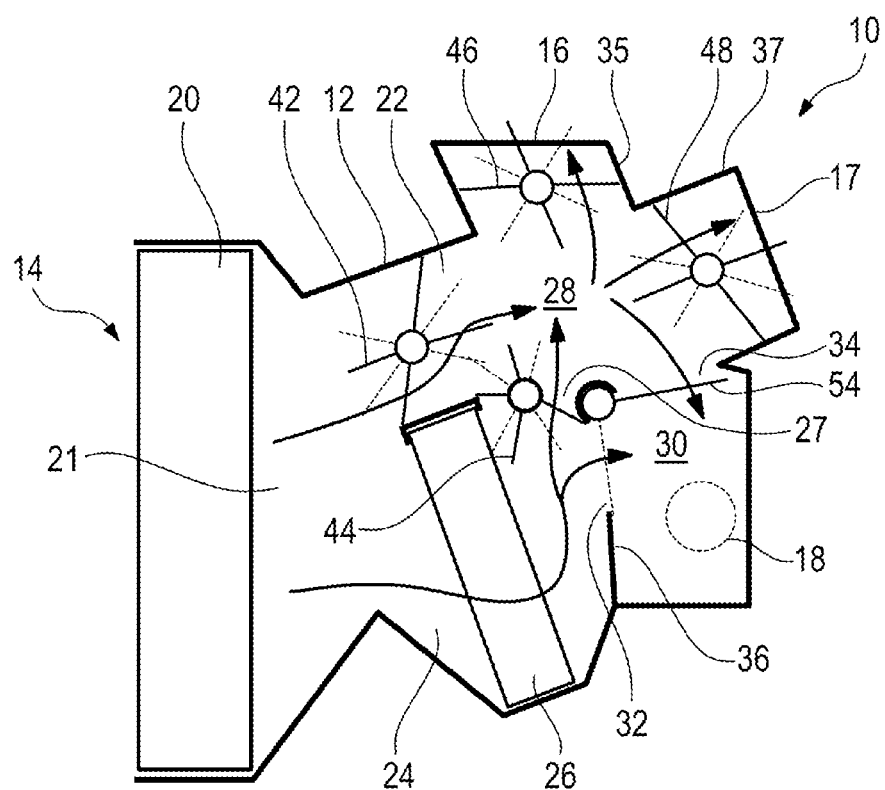
FIG. 2 shows a further heating, ventilation and/or air conditioning unit according to the invention in a schematic sectional illustration.

FIG. 2 shows a further embodiment of a heating, ventilation and/or air conditioning unit 10 according to the invention for a car in a schematic sectional illustration.

The embodiment as per FIG. 2 differs from the embodiment as per FIG. 1 in that, instead of the two flaps 38, 40 at the openings 32, 34 to the second mixing chamber 30, only a single flap 54 is provided in order to adjust the air feed to the second mixing chamber 30. The flap 54 is a single-wing flap, by contrast to the other flaps.

The flap 54 is mounted so as to be movable between a first position and a second position. In the first position, which is illustrated in FIG. 2, the flap 54 closes the opening 34 of the first mixing chamber 28 to the second mixing chamber 30. In the second position, which is illustrated by dashed lines in FIG. 2, the flap 54 closes the opening 32 of the second air guide 24 to the second mixing chamber 30. Furthermore, intermediate positions of the flap 54 are possible in which air can flow both through the opening 32 and through the opening 34 into the second mixing chamber 30.

The invention claimed is:

1. A heating, ventilation and/or air conditioning unit for a car, comprising:
   a first air guide for guiding a first, cold air stream;
   a second air guide for guiding a second, warm air stream which is separate from the first air stream, wherein a heating device for warming the second air stream is arranged in the second air guide;
   a first mixing chamber, wherein the first air guide and the second air guide open into the first mixing chamber; and
   a second mixing chamber, wherein the first mixing chamber and the second air guide each have at least one opening to the second mixing chamber,
   a first flap disposed in the second air guide, the first flap being configured to move between a first closed position, in which a flow path of the second air stream to the first mixing chamber is closed, and a first open position, in which the second air stream can flow into the first mixing chamber, wherein the first flap is arranged downstream of the heating device and at a first opening of the second air guide into the first mixing chamber,
   a second flap disposed at a second opening to the second mixing chamber, the second flap being configured to move between a second closed position, in which a flow path of a mixed air stream produced by merging the first, cold air stream and the second, warm air stream in the first mixing chamber to the second mixing chamber is closed, and a second open position, in which the mixed air stream flows into the second mixing chamber, and
   a third flap disposed at a third opening to the second mixing chamber, the third flap being configured to move between a third closed position in which a flow path of the second, warm air stream to the second mixing chamber is closed, and a third open position in which the second, warm air stream flows to the second mixing chamber,
   wherein, when the first flap is in the first closed position, the second flap is in the second closed position, and the third flap is in the third open position, the second, warm air stream flows exclusively through the third opening to the second mixing chamber without mixing with the mixed air stream.

2. The heating, ventilation and/or air conditioning unit as claimed in claim 1, wherein in the first air guide, there is arranged a further flap which is movable between a closed position, in which a flow path of the first air stream to the first mixing chamber is closed, and an open position, in which the first air stream can flow into the first mixing chamber.

3. The heating, ventilation and/or air conditioning unit as claimed in claim 1, wherein the second flap and the third flap are kinematically coupled to one another.

4. The heating, ventilation and/or air conditioning unit as claimed in claim 1, wherein the first mixing chamber has at least one outlet opening which leads to a car interior.

5. The heating, ventilation and/or air conditioning unit as claimed in claim 1, wherein the first mixing chamber has separate channels to different interior regions, which channels are each closable by means of a dedicated flap.

6. The heating, ventilation and/or air conditioning unit as claimed in claim 1, wherein the heating, ventilation and/or air conditioning unit has an evaporator, wherein the first and the second air guide are arranged downstream of the evaporator.

7. The heating, ventilation and/or air conditioning unit as claimed in claim 1, wherein the first and the second air guide, the first mixing chamber and/or the second mixing chamber are formed in a common housing.

8. The heating, ventilation and/or air conditioning unit as claimed in claim 7, wherein the heating device and/or an evaporator are likewise accommodated in the common housing.

* * * * *